United States Patent [19]

Barabas et al.

[11] 3,941,718

[45] Mar. 2, 1976

[54] INSOLUBLE CROSSLINKED HOMOPOLYMERS AND COPOLYMERS, POLYMERIZED ON AN INERT SUBSTRATE

[75] Inventors: Eugene S. Barabas, Watchung; Frederick Grosser, Midland Park, both of N.J.

[73] Assignee: GAF Corporation, New York, N.Y.

[22] Filed: May 30, 1974

[21] Appl. No.: 474,802

Related U.S. Application Data

[63] Continuation-in-part of Ser. No. 294,522, Oct. 3, 1972, abandoned.

[52] U.S. Cl. ............... 252/430; 252/428; 427/192; 427/423; 260/42
[51] Int. Cl.² ......................................... B01J 31/06
[58] Field of Search.................. 252/426, 428, 430; 117/100 S

[56] References Cited
UNITED STATES PATENTS

| | | | |
|---|---|---|---|
| 2,842,504 | 7/1958 | Jones | 252/430 |
| 2,876,133 | 3/1959 | Iler et al. | 117/100 S X |
| 2,952,643 | 9/1960 | Voge | 252/430 |
| 3,557,038 | 1/1971 | Gebura | 117/100 S X |
| 3,725,111 | 4/1973 | Horvath et al. | 117/100 S X |

*Primary Examiner*—Patrick P. Garvin
*Attorney, Agent, or Firm*—Walter C. Kehm; James N. Blauvelt

[57] ABSTRACT

Crosslinked homopolymers and copolymers of N-vinyl-2-pyrrolidone formed by addition polymerization through ethylenically unsaturated groups are polymerized on solid, inert carriers. Heavy crosslinking is employed to render the polymers insoluble. The polymers can be made by copolymerizing, with N-vinyl-2-pyrrolidone, amides or substituted amides of unsaturated carboxylic acids, such as acrylamide, substituted and unsubstituted unsaturated carboxylic acids, such as methacrylic acid or halfacid maleates. Also included are comonomers containing basic nitrogen groups therein, such as vinyl pyridine, or alkylamino acrylates and methacrylates. The polymers are formed on inert substrates of both solid and porous types.

5 Claims, No Drawings

INSOLUBLE CROSSLINKED HOMOPOLYMERS AND COPOLYMERS, POLYMERIZED ON AN INERT SUBSTRATE

CROSS-REFERENCE TO RELATED APPLICATIONS

This application is a continuation-in-part of a copending application of Eugene S. Barabas et al., application Ser. No. 294,522, filed Oct. 3, 1972, and now abandoned.

BACKGROUND OF THE INVENTION

1. Field of the Invention

This invention relates to water insoluble crosslinked homopolymers and copolymers formed on an inert substrate by the addition polymerization of monomers containing ethylenic unsaturation.

2. Description of the Prior Art

Polymers and copolymers of N-vinyl lactams and particularly N-vinyl pyrrolidone have been heretofore produced in insoluble form. As used herein the term "insoluble" is intended to define products which are insoluble in water, strong mineral acids, caustic solutions and common organic solvents. Illustrative insoluble polymers of N-vinyl lactams are those represented by the polyvinyl pyrrolidones of U.S. Pat. Nos. 3,216,579; 2,927,913 and 3,511,823, as distinguished from the polyvinyl pyrrolidones such as represented by U.S. Pat. Nos. 2,265,450 and 2,335,454.

It is known that beverages such as beer can be purified when contacted with inorganic clay carriers coated with a vinyl resin such as polyvinyl acetate or a poly N-vinyl pyrrolidone, as disclosed for example in U.S. Pat. No. 3,424,588, or with polyvinyl pyrrolidone which has been crosslinked or complexed with polyacids such as polyacrylic and tannic acids and their derivatives.

It has been found that polymeric selective adsorbents heretofore employed were not as effective as might be desired. A primary difficulty with these adsorbents is that they do not efficiently utilize the potentially available active sites. When employed as fine powders of the polymeric material, a large proportion of the potentially active sites is buried within the polymeric particle and is thus not available for adsorption. And, even when these polymers are coated on inert carriers by conventional coating techniques, the coating thickness is so great that a large proportion of the potentially active sites remain unavailable for adsorption. The present invention, however, embraces means for overcoming these difficulties, and provides improved polymeric selective adsorbents useful for purification of beverages, such as beer, by complexing undesirable dissolved materials from the liquid, and removing them by filtration; and a method for obtaining a uniform, shape-stable insoluble, as well as a crosslinked polymeric film on an inert carrier.

SUMMARY OF THE INVENTION

The accomplishment of the present invention is achieved by blending at least one monomer capable of addition polymerization through an unsaturated bond, a crosslinking agent and an inert carrier and then polymerizing the blend until a water insoluble polymeric coating is formed on the inert carrier. The crosslinking agent can be a polyfunctional monomer containing more than one polymerizable unsaturated group. Typical monomers capable of addition polymerization through an unsaturated bond, are, for example, unsaturated monocarboxylic acids, amides of unsaturated monocarboxylic acids, mono esters of unsaturated polycarboxylic acids, N-vinyl lactams, vinyl monomers containing basic nitrogen groups therein and copolymerizable mixtures thereof. The inert substrates or carriers employed in the present invention can be either organic or inorganic, synthetic or naturally occurring materials. Typical carriers can be swelling or nonswelling clays, zeolites, alkaline earth metal oxides and hydroxides, silica gel, glasses, ion exchange resins, talc, diatomaceous earth and the like.

DESCRIPTION OF THE PREFERRED EMBODIMENTS

In the system of the present invention, a polymer or copolymer is polymerized in situ on the surface of a solid carrier thus producing a system which consists of a carrier and an insoluble polymeric coating on the surface of the carrier.

The products of the present invention have a highly desirable degree of shape-stability which is believed to be obtained by means of the in situ crosslinking reaction which produces such a strong film that usual rupture of the film and swelling of the substrate are minimized or eliminated entirely.

The body of the carrier can be non-absorbent, in which case the insoluble polymer forms a continuous coating on the surface of the carrier. A porous, absorbent carrier is, however, preferred, in which case the insoluble polymer will be deposited as a continuous coating on both the surface of the carrier and in the canals of its pores. This is a prime advantage of the present invention and it is directly attributable to coating with polymerizable monomers as opposed to coating with a polymer or polymer solution. The relatively small molecular size of the monomer molecules enables penetration of the monomer into the pores of a porous carrier. Like penetration of the greatly larger polymer molecules is not possible. After in situ polymerization according to the present invention, an extremely thin polymeric film is achieved not only on the exterior surface of the porous carrier but also on the interior surfaces of the canals thereof. Thus, the present invention provides polymeric selective absorbents having higher specific area and coordinately more efficient utilization of active adsorption sites than were previously known.

The vehicle or carrier used can be either organic or inorganic, as well as synthetic or naturally occurring, so long as it has sufficiently high surface area and adsorptive capacity for the particular end use. Clays, such as the nonswelling clays, including kaolinite, attapulgite and other sub-bentonites can be used, as well as swelling clays such as the bentonites and montmorillonites, particularly hectorite.

The carrier can also be selected from natural and synthetic zeolites, alkaline earth metal oxides and hydroxides, talc, silica gel, glasses, ion exchange resins, diatomaceous earth, as well as polymeric substrates.

Usefull resins in accordance with the present invention, which can be employed in combination with the abovedescribed carriers include all of those polymeric entities which can be prepared by addition polymerization through an unsaturated bond and which react with phenols, acids and bases in order to bind them and remove them from the reaction medium. The most preferred group of resins are the homopolymers and copolymers of N-vinyl lactams, particularly N-vinyl-2-pyrrolidone.

One group of compounds suitable as monomers and comonomers includes unsaturated organic acid monomers containing one or more carboxyl groups and capable of copolymerization with N-vinyl lactams such as N-vinyl-2-pyrrolidone. Preferred acids include, e.g., half esters of maleic acid and fumaric acid, respectively. Furthermore, itaconic acid, crotonic acid, methacrylic acid, acrylic acid and the like, are also useful. Substituted and unsubstituted derivatives of the foregoing unsaturated carboxylic acids are also utilizable herein and include, e.g., amides such as acrylamide, or dimethyl-acrylamide.

Useful resins include copolymers, containing hydroxy groups such as polyvinyl alcohols. This type of material is prepared by controlled hydrolysis of the copolymers of vinyl esters.

Another group of suitable monomers and comonomers includes the unsaturated basic N-containing compounds such as the 2- and 4- vinyl pyridines and their derivatives: e.g., $\alpha$- or $\beta$- vinyl picoline, vinyl 2,5- lutidine, etc. Also suitable are the mono- and di- $C_1$-$C_4$ alkylamino acrylates and methacrylates such as dimethylamino acrylate or methacrylate, t-butylamino acrylate or methylacrylate, etc.

The insolubility of the present polymers is brought about by using a polyfunctional comonomer which contains more than one polymerizable unsaturated bond. Monomers such as divinyl benzene, methylene-bis-acrylamide, ethylidene-bis-vinyl pyrrolidone, divinyl ethers of polyalkylene glycol, diacrylates of a polyalkene glycol, diallyl, allyacrylates and the like are suitable for producing a network which renders the polymeric coating on the surface of the carrier insoluble.

The polymers formed according to the present invention have molecular weights within the range of from about 5,000 to 1,000,000, preferably from about 10,000 to 100,000.

The ratio of the mono-functional to poly-functional comonomers can be varied from about 99.9:0.1 to 1:1, preferably 99:1 to 9:1, depending upon the desired density of the network. Extensive crosslinking of the polymer is obtained throughout the above broad range; and, sufficient crosslinking is effected to render the polymer insoluble even at the lower limits thereof.

Preferred polymers in accordance with the present invention are represented by the following formula:

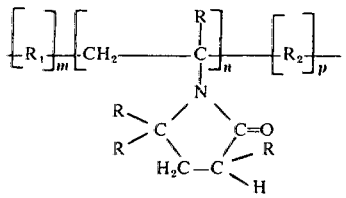

wherein R is hydrogen or an alkyl group containing from 1 to 5 carbon atoms; $R_1$ is a monomer containing one double bond; $R_2$ is a monomer containing two or more double bonds; $m$ represents the number of moles of $R_1$; $n$ represents the number of moles of the residuum of a N-vinyl lactam; and $p$ represents the number of moles of $R_2$; where the ratio of $m$ to $n$ is within the range of from 0 to 1:1; and the ratio of $(m+n)$ to $p$ is within the range of from 99.9:0.1 to 1:1.

Typical of the functional comonomers which contain one double bond and which can be employed in the copolymers defined by the above formula are vinyl monomers having the characteristic $>C=C<$ monomeric structure, including: esters of saturated alcohols with polybasic unsaturated acids such as mono-alkyl maleates, mono-alkyl fumarates and mixtures thereof; vinyl esters such as vinyl acetate, which may optionally be hydrolyzed after polymerization; unsaturated amides such as acrylamide, methacrylamide and mixtures thereof; N-substituted unsaturated amides such as N,-N-di-methyl acrylamide, N-methyl acrylamide and mixtures thereof; unsaturated ketones such as methyl vinyl ketone; unsaturated aldehydes such as acrolein, methacrolein, and mixtures thereof; unsaturated basic heterocyclic compounds such as vinyl pyridine, vinyl picoline, N-vinyl carbazole, and mixtures thereof; unsaturated thio compounds such as vinyl thioethers; unsaturated acids such as acrylic acid, methacrylic acid and mixtures thereof; and isocyanates such as vinyl isocyanate; etc.

Typical of the polyfunctional comonomers containing more than one double bond which can be employed in the polymers defined by the above formula are divinyl monomers including: divinyl benzene; methylene-bis-acrylamide; ethylidene-bis-vinyl pyrrolidone; divinyl ethers of polyalkylene glycol; divinyl ketone; conjugated diolefins such as butadiene, isoprene and mixtures thereof; diallyl compounds such as diallyl, diallyl ether, diallylphthalate and mixtures thereof; allylacrylates, such as allyl acrylate; triallylcyanurate; diacrylates of a polyalkene glycol; etc.

The resin is present in combination with the carrier in an amount sufficient to achieve the desired result of hydration resistance and insolubility in the fluid containing the solute to be adsorbed, the carrier comprising a major part of the adsorbent. In general, the carrier comprises about 50% to about 99% by weight of the adsorbent, and the polymer comprises about 1 to about 50% by weight of the adsorbent, depending upon the porosity of the carrier and the particular system in which the polymer-carrier combination is to be used.

The blending of the comonomers with the carrier takes place prior to polymerization by absorbing the ingredients of the reaction in the solid carrier. Mechanical devices, such as a hammer or ball mill can be used in order to achieve uniform distribution. A uniform distribution of the ingredients of the reaction in the carrier can be achieved by combining the carrier and the ingredients in a solution or a slurry such as an aqueous slurry. A suitable organic solvent such as benzene or alcohol in which the monomers can be dissolved can be used. Thereafter, the dissolved monomers can be admixed with the carrier. While it is preferred to carry out the polymerization reaction in the absence of solvents or diluents, such ingredients can be used to facilitate the absorption of the monomers, or to dissipate the heat of polymerization.

The preparation of the polymeric coating is effected by subjecting the mixture to conditions fostering polymerization through ethylenically unsaturated groups. The polymerization can be induced by high energy radiation or by free radical initiators such as azo-bis-isobutyronitrile, t-butyl peroxypivalate, benzoyl peroxide or the like. The reaction is preferably carried out in the absence of free oxygen, conveniently under a blanket of a neutral or inert gas.

The following examples will serve to further illustrate the practice of the invention with greater particularity although it is to be understood that the invention is not limited thereto. Unless otherwise stated, all percentages and parts referred to herein and the appended claims are by weight.

EXAMPLE 1

200 grams of a diatomaceous earth produced under the name "Celite 503" by the Johns-Manville Corp. are charged to a 2 liter kettle. The contents of the kettle are heated to 80°C., then the kettle is attached to a vacuum pump, and the pressure in the kettle is reduced to 30 millimeters of mercury. The temperature and the vacuum are held for four hours in order to remove occluded air, and then the system is cooled to 25°C.

A mixture of 380 grams of N-vinyl-2-pyrrolidone, 20 grams divinyl benzene and 1 gram azo-bis-isobutylronitrile is added to the Celite, and then the vacuum is broken with nitrogen. Heating is started, and the mixture is heated to 60°C. At this point the heating is stopped, and cooling is started with the help of an exterior ice-water cooling bath. The temperature peaks at 112°C., then it is brought back to 90°C., which is then maintained for four hours. The system is then cooled to 25°C.

The reaction product, a grayish-white material is placed in a Soxhlet apparatus and extracted with ether to remove the unreacted monomer. Then the reaction product is slurried in water and filtered through an 80 mesh screen in a pressure filter to remove uncoated fines. The cake is re-slurried in water and the slurry is centrifuged and washed until the effluent is negative for vinyl pyrrolidone. It is then extracted again for sixteen hours with ether and washed with water on the centrifuge in order to remove uncrosslinked polyvinyl pyrrolidone. Finally the material is placed in a vacuum oven and dried at 65°C. The dry polymer-carrier combination is ball-milled.

The final product has a nitrogen content of 2.8%, equivalent to 22.2% vinyl pyrrolidone.

EXAMPLE 2

Into a 1 liter kettle are charged, in the following order, 400 grams distilled water, 50 grams Celite 503, 50 grams N-vinyl-2-pyrrolidone and 1 gram ethylene-bis-vinyl pyrrolidone.

The system is purged by nitrogen and then the contents of the kettle are heated to 80°C. At this temperature, 0.25 grams azo-bis-isobutyronitrile is introduced. The mixture is stirred for 1 hour at 80°C. and then cooled to room temperature.

The mixture is slurried in 500 milligrams of distilled water and stirred for one hour. After filtration, the polymer-carrier system is reslurried in 800 milligrams water and stirred for one hour. This treatment is followed by a third extraction with 300 ml water. Finally, the product is filtered and dried in vacuo at 65°C.

The final product has a nitrogen content of 5.89%, equivalent to 46.7% crosslinked polyvinylpyrrolidone.

EXAMPLE 3

The procedure of Example 1 is followed, except that the carrier is montmorillonite which is ground and sieved through a 100 mesh screen and the charge thereof is as follows: 320 grams N-vinyl-2-pyrrolidone, 60 grams acrylamide, 20 grams methylene-bis-acrylamide and 1 gram tetra-potassium peroxy diphosphate dissolved in 1 gram distilled water. Substantially similar results are obtained.

EXAMPLE 4

The procedure of Example 1 is followed, except that the carrier is glass-helices, and the charge is as follows: 320 grams N-vinyl-2-pyrrolidone, 60 grams dimethylaminoethyl methacrylate, 20 grams divinyl benzene, 1 gram t-butyl-peroxy pivalate. Substantially similar results are obtained.

EXAMPLE 5

The procedure of Example 1 is followed, except that the carrier is clay boiling chips ground and sieved through a 100 mesh screen and the charge is as follows: 320 grams N-vinyl-2-pyrrolidone, 60 grams maleic acid butyl ester, 20 grams ethylidene-bis-vinyl pyrrolidone, 1 gram azo-bis-isobutyronitrile. Substantially similar results are obtained.

EXAMPLE 6

The procedure of Example 1 is followed, except that the carrier is beads of silicon rubber, and the charge is as follows: 320 grams N-vinyl-2-pyrrolidone, 60 grams 4-vinyl pyridine, 20 grams allyl methacrylate, 1 gram benzoyl peroxide. Substantially similar results are obtained.

The polymer-carrier systems of the present invention have unique characteristics which are essential in their use as selective adsorbents. The polymer coating is very thinly distributed, but completely covers the large surface area of the porous carrier, thus providing an increased efficiency per gram of polymer used, as compared with systems which do not employ the features of the present invention. The polymer film on the surface of the carrier has shape-stability because of the heavy crosslinking which is achieved. The crosslinking limits the extent of swelling which carriers, such as swelling clays can undergo, thus keeping the total surface of the polymer film available over the total surface of the carrier. The heavy crosslinking renders the polymer completely insoluble. This property is very important, especially when these materials are used as a selective adsorbent in food, industrial, pharmaceutical or medical applications.

Examples of the selective adsorbent applications of the polymer-carrier systems of the present invention include their use in removing harmful solutes from liquids, such as proteinaceous complexes, tannins and phenols; and their use in concentrating and recovering valuable solutes such as enzymes, noble and rare metals from solutions in which they are present in very small or trace amounts, as well as their use in the adsorption of gases and vapors.

The following example illustrates the suitability of the polymer-carrier systems of the present invention as selective adsorbents.

EXAMPLE 7

13.81 grams of salicyclic acid are dissolved in 500 ml. methanol and diluted to one liter with distilled water. 64.5 grams of the resulting solution is placed in an 8 oz. bottle together with 6.76 grams of the crosslinked poly(N-vinyl-2-pyrrolidone) on Celite selective adsorbent prepared in the manner described in Example 1. This latter amount of selective adsorbent corresponds to 1.5 grams of 100% active polymer. The mixture is placed on a shaker and is shaken for 5 minutes. The bottle is then removed and the contents thereof are filtered through Whatman No. 4 filter paper on an 8 cm. Buchner funnel using 23 in. vacuum. Exactly 50 ml. of the filtrate are transferred to a 250 ml. Erlenmeyer flask. After addition of 6 drops of phenolphthalein indicator, the solution is titrated to a pink endpoint with 0.1 N sodium hydroxide solution.

The adsorption efficiency (calculated as the percent difference between a treated sample and a blank) is 30.5%. Adsorption efficiencies of this magnitude render these selective adsorbents of the present invention useful, for example, as active chill-proofing agents for removal of impurities, especially of the phenolic-type, from beers, wines and the like.

What is claimed is:

1. An improved method for the forming of an improved adsorbent consisting essentially of an insoluble, cross-linked polymeric coating having selective adsorption properties and an inert, porous carrier comprising:
    a. blending (1) at least one monomer selected from the group consisting of N-vinyl-2-pyrrolidone, vinyl acetate, a mono-alkyl maleate, a mono-alkyl fumarate, itaconic acid, crotonic acid, acrylic acid, methacrylic acid, acrylamide, methacrylamide, dimethylacrylamide, and mixtures thereof, (2) a cross-linking agent which is a poly-functional monomer containing more than one polymerizable unsaturated group selected from the group consisting of divinyl benzene, methylene-bis-acrylamide, ethylidine-bis-vinyl pyrrolidone, divinyl ethers of polyalkylene glycol, divinyl ketone, butadiene, isoprene, diallyl, diallyl ethers, diallylphthalate, allyl acrylate, and mixtures thereof, and (3) an inert solid carrier comprising about 50% to about 99% by weight of the adsorbent, the weight ratio of said monomer to said cross-linking agent being within the range of from about 99.9:0.1 to about 1:1, respectively, the monomer and cross-linking agent being employed in a sufficient amount to achieve a uniform distribution of said materials over the surface area of the inert carrier, and
    b. subjecting said blend to polymerization-inducing conditions so as to polymerize said monomer and said cross-linking agent in situ on the surface of said carrier, thus forming an insoluble polymeric film completely covering the surface area of said carrier, whereby the polymeric selective adsorbent having an enhanced availability of active sites available for adsorption is produced.

2. The method of claim 1 in which the inert carrier is a member selected from the group consisting of clays, zeolites, alkaline earth metal oxides, alkaline earth hydroxides, silica gel, glasses, ion exchange resins, diatomaceous earth and mixtures thereof.

3. The method of claim 1 in which said polymerizable monomer is N-vinyl-2-pyrrolidone.

4. The method of claim 1 in which said inert carrier is a porous, absorbent carrier, said insoluble polymeric film being formed as a continuous film on both the exterior surface of the carrier and on the pore surfaces thereof.

5. A selective adsorbent comprising an inert carrier having a substantially uniform, shape-stable coating thereon of an insoluble, crosslinked polymeric film obtained by the process of claim 1.

* * * * *